US012369505B2

(12) United States Patent
Garner et al.

(10) Patent No.: US 12,369,505 B2
(45) Date of Patent: Jul. 29, 2025

(54) AGRICULTURAL MACHINE WITH ADJUSTABLE FRAME FOR VARIABLE ROW PLANTING

(71) Applicant: DEERE & COMPANY, Moline, IL (US)

(72) Inventors: Elijah B. Garner, Bettendorf, IA (US); Tyler G. Groves, Bettendorf, IA (US); Shane J. Brueggen, Louisburg, KS (US); Steve P. Robisky, Cedar Falls, IA (US); Lee A. Johnson, Polk City, IA (US)

(73) Assignee: Deere & Company, Moline, IL (US)

( * ) Notice: Subject to any disclaimer, the term of this patent is extended or adjusted under 35 U.S.C. 154(b) by 846 days.

(21) Appl. No.: 17/584,757

(22) Filed: Jan. 26, 2022

(65) Prior Publication Data

US 2023/0232729 A1 Jul. 27, 2023

(51) Int. Cl.
*A01B 63/00* (2006.01)
*A01C 7/10* (2006.01)

(52) U.S. Cl.
CPC ............ *A01B 63/002* (2013.01); *A01C 7/102* (2013.01)

(58) Field of Classification Search
CPC ....... A01B 63/002; A01B 63/00; A01C 7/102; A01C 7/10; A01C 7/08; A01C 7/00
See application file for complete search history.

(56) References Cited

U.S. PATENT DOCUMENTS 10,575,460 B2 3/2020 Davis et al.
10,799,903 B2 10/2020 Davis et al.

FOREIGN PATENT DOCUMENTS

EP 2030495 A1 3/2009
EP 3235362 A1 10/2017
EP 3366097 A1 8/2018

OTHER PUBLICATIONS

Extended European Search Report and Written Opinion issued in European Patent Application No. 22200643.9, dated Jun. 21, 2023, in 9 pages.

*Primary Examiner* — Christopher J. Novosad
(74) *Attorney, Agent, or Firm* — Taft Stettinius & Hollister LLP; Stephen F. Rost

(57) ABSTRACT

An adjustable frame assembly of a planter includes a main frame, a first frame member movably coupled to the main frame, and a drive mechanism operably coupled between the main frame and the first frame member for moving the first frame member along the first axis relative to the main frame. The first frame member is laterally movable along a first axis which is perpendicular to a direction of travel of the planter. The frame assembly also includes a first arm having a first end and a second end, the first end being coupled to the main frame and the second end being coupled to a first row unit. A second arm is provided having a first end and a second end, where the first end is coupled to the first frame member and the second end is coupled to the first row unit.

20 Claims, 11 Drawing Sheets

AGRICULTURAL MACHINE WITH ADJUSTABLE FRAME FOR VARIABLE ROW PLANTING

FIELD OF THE DISCLOSURE

The present disclosure relates to a machine, and in particular, to an agricultural machine having an adjustable frame to achieve variable row planting.

BACKGROUND

In the seeding industry, there is a desire or need to plant crops at different row spacings. This can be due to crop type, e.g., wheat is generally planted on narrower row spacings than corn, or growing conditions, e.g., in areas where field conditions are wet soybeans may benefit from being planted at a wider row spacing than in drier areas. It can also be advantageous to have more fore aft offset between adjacent row units in more narrow row spacings in order to allow field residue to pass between adjacent row units with less potential for obstruction and plugging.

There is a need for an agricultural machine having an adjustable frame capable of being adjusted based on, inter alia, crop type or growing conditions.

SUMMARY

In one embodiment of the present disclosure, an adjustable frame assembly of a planter includes a main frame; a first frame member movably coupled to the main frame, the first frame member being laterally movable along a first axis which is perpendicular to a direction of travel of the planter; a drive mechanism operably coupled between the main frame and the first frame member for moving the first frame member along the first axis relative to the main frame; a first arm having a first end and a second end, the first end being coupled to the main frame and the second end being coupled to a first row unit; and a second arm having a first end and a second end, the first end being coupled to the first frame member and the second end being coupled to the first row unit.

In a first example of this embodiment, a second row unit may be coupled to the first frame member. In a second example, a movement of the first frame member changes a distance between the first and second row units in a lateral direction and a fore-aft direction. In a third example, a third row unit is coupled to the main frame, wherein movement of the first frame member relative to the main frame changes a distance between the third row unit and the first and second row units. In a fourth example, movement of the first frame member changes the distance between the third row unit and the first row unit in the fore-aft direction. In a fifth example, movement of the first frame member changes the distance between the second row unit and the third row unit only along the first axis.

In a sixth example, a movement of the first frame member towards the main frame induces movement of the first row unit in a rearward direction, and a movement of the first frame member away from the main frame induces movement of the first row unit in a forward direction. In a seventh example, the drive mechanism comprises an electric actuator, a hydraulic actuator, an electric motor, or a rack and pinion gearing assembly. In an eighth example, an electric motor is operably coupled to the first arm to pivotally move the first arm relative to the main frame or first row unit. In a further example, the first arm is pivotally coupled to the main frame or the first row unit, and the second arm is pivotally coupled to the first frame member or the first row unit.

In another embodiment of the present disclosure, an agricultural machine for traversing a field to perform a seeding operation includes a main frame disposed along a first axis perpendicular to a forward travel direction; a first frame member movably coupled to the main frame, the first frame member being movable along the first axis; a first drive mechanism operably coupled between the main frame and the first frame member for moving the first frame member along the first axis relative to the main frame; a second frame member movably coupled to the main frame, the second frame member being movable along the first axis; a second drive mechanism operably coupled between the main frame and the second frame member for moving the second frame member along the first axis relative to the main frame; a plurality of row units for performing the seeding operation, the plurality of row units comprising at least a first row unit, a second row unit, a third row unit, a fourth row unit, and a fifth row unit; a first arm having a first end and a second end, the first end being coupled to the main frame and the second end being coupled to the fourth row unit; a second arm having a first end and a second end, the first end being coupled to the first frame member and the second end being coupled to the fourth row unit; a third arm having a first end and a second end, the first end being coupled to the main frame and the second end being coupled to the fifth row unit; and a fourth arm having a first end and a second end, the first end being coupled to the second frame member and the second end being coupled to the fifth row unit; wherein, the first row unit is coupled to the first frame member, the second row unit is coupled to the main frame, and the third row unit is coupled to the second frame member.

In a first example of this embodiment, the first arm is pivotally coupled to the main frame or the fourth row unit; the second arm is pivotally coupled to the first frame member or the fourth row unit; the third arm is pivotally coupled to the main frame or the fifth row unit; the fourth arm is pivotally coupled to the second frame member or the fifth row unit. In a second example, the first row unit, second row unit, and third row unit are arranged in a first rank; the fourth row unit and fifth row unit are arranged in a second rank; and the first rank is located forward of the second rank.

In a third example, a movement of the first frame member and second frame member towards the main frame induces movement of the first row unit and third row unit towards the main frame and the fourth row unit and fifth row unit in a rearward direction; a movement of the first frame member and second frame member away from the main frame induces movement of the first row unit and third row unit away from the main frame and the fourth row unit and fifth row unit in a forward direction. In a fourth example, the second row unit remains stationary relative to the main frame during any movement of the first or second frame members.

In a further embodiment of the present disclosure, an adjustable frame of a work machine includes a main frame; a first frame member movably coupled to the main frame in an axial direction substantially perpendicular to a direction of travel of the work machine; a drive mechanism operably coupled between the main frame and the first frame member for moving the first frame member relative to the main frame; a first arm being coupled to the main frame at one end and to a row unit at an opposite end thereof; and a second arm being coupled to the first frame member at one end and to the row unit at an opposite end thereof.

In a first example of this embodiment, a movement of the first frame member relative to the main frame induces a movement of the row unit in a fore-aft direction. In another example, the first arm is pivotally coupled to the main frame or the row unit and the second arm is pivotally coupled to the first frame member or the row unit. In yet another example, a second row unit is directly coupled to either the main frame or the first frame member, wherein a movement of the first frame member changes a distance between the row unit and the second row unit in the axial direction and the fore-aft direction. In a further example, as the first frame member is moved in the axial direction away from the main frame, the row unit moves in a forward direction and the second row unit moves outwardly away from the main frame; as the first frame member is moved in the axial direction towards the main frame, the row unit moves in a rearward direction and the second row unit moves inwardly toward the main frame.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
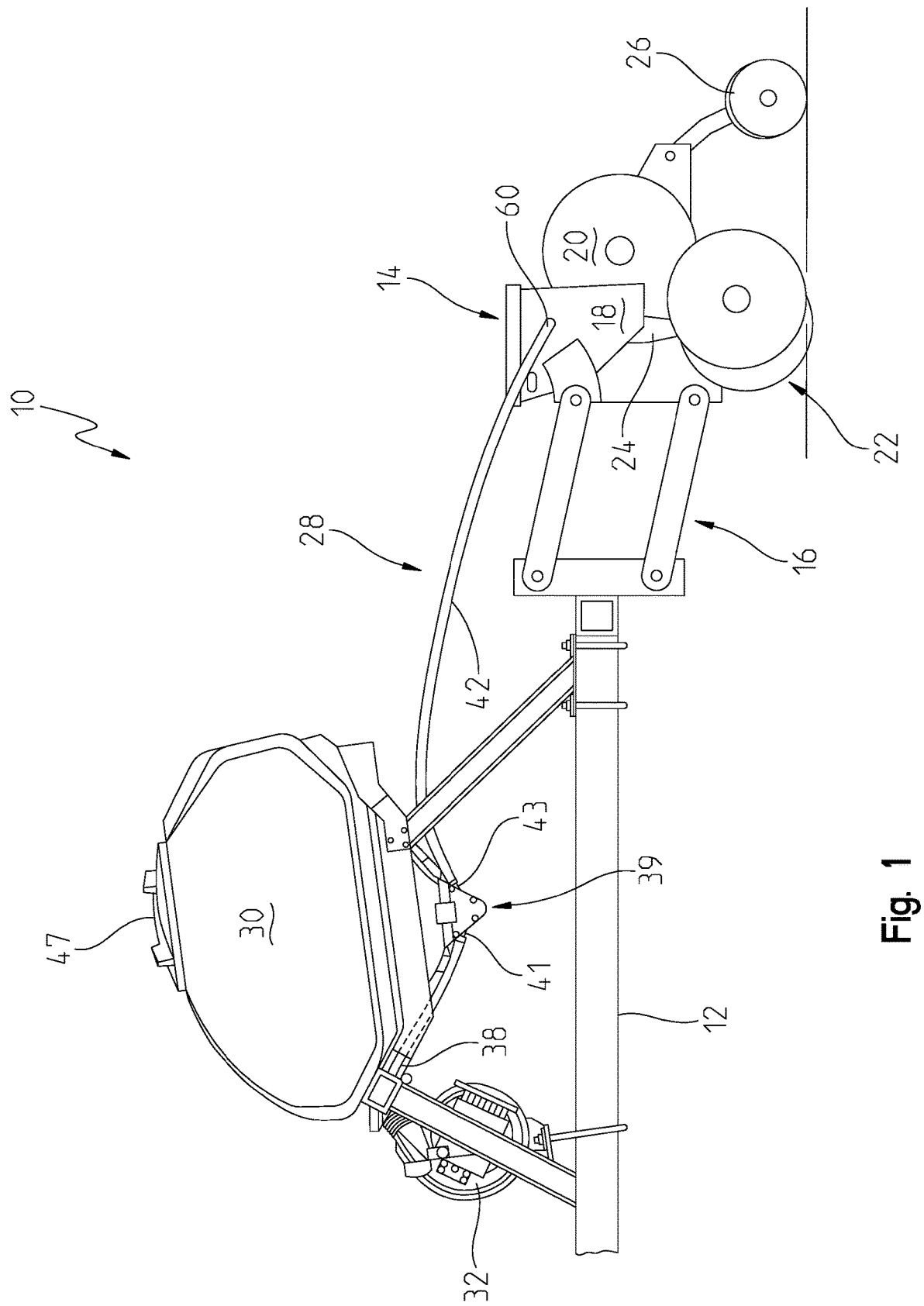
FIG. 1 is a schematic, side view of an agricultural work machine having a product distribution system.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

With conventional planters, it is common for an operator to only use a portion of the number of available of row units for a work operation. The unused row units may be carried through the field without doing any work. This can be a waste of fuel consumption and adds unnecessary compaction to the fields as the machine traverses through it. The unused row units may not be used when the operator desires to increase row spacing between row units to plant corn instead of wheat or canola.

In the present disclosure, a work machine such as an agricultural planter or seeder is disclosed having an adjustable frame design for accommodating the needs in the seeding industry while at the same time doing so with a modulatable machine configuration that is capable of being modular. As will be described below, this frame design can be a scissor-based design, an accordion-style design, etc. The adjustable frame can be modular in the sense that a 12-row machine can be configured, for example, as an 8-row, 16-row, or 24-row machine. It will be appreciated from this disclosure that any number of different types of seeding row units may be installed on the frame structure such as double disk openers, single disk openers, dual trench openers, fertilizer openers, or any combination thereof.

The embodiments of the present disclosure may also be built as an autonomous machine, a drawn planter, or an integral planter. The present disclosure discloses one or more embodiments that have the potential to adjust row units "on the go" to some extent to seed around objects in the field or take advantage of different row spacings based on current or changing soil/field conditions.

When implemented as an autonomous vehicle, it is possible for the adjustable frame design to include mechanical weeding tools in place of row units and thus become a dual purpose machine. With an autonomous vehicle, the adjustable frame may be controllable to a narrow configuration for self-transport or for shipping on a trailer.

In the present disclosure, some embodiments are capable of allowing each row unit and overall frame weight to be fully and optimally utilized regardless of the type of crop being planted. The frame may be designed with only the weight that is needed for a desired number of row units to perform a seeding operation, for example, in the ground. Further, the frame may be designed to provide sufficient tractive ability to allow the desired number of row units to perform their function as the same downforce and tractive ability needed regardless of the width configuration (e.g., 10" row spacing vs 10" row spacing) of the frame.

Turning to FIG. 1 of the present disclosure, an embodiment of an agricultural work machine 10 such as a planter or seeder may include a frame 12 to which is mounted one or more planter or row units 14. In FIG. 1, only a single row unit 14 is shown, but it is to be understood that a plurality of row units 14 may be coupled to the frame 12 in a known manner. The row unit 14 may be coupled to the frame 12 by a parallelogram linkage 16 so that the row unit 14 can move up and down to a limited degree relative to the frame 12.

Each row unit 14 may include an auxiliary or secondary hopper 18 for holding product such as fertilizer, seed, chemical, or any other known product. In this embodiment, the secondary hopper 18 may hold seed. As such, a seed meter 20 is shown for metering seed received from the secondary seed hopper 18. A furrow opener 22 may be provided on the row unit 14 for forming a furrow in a field for receiving metered seed (or other product) from the seed meter 20. The seed or other product may be transferred to the furrow from the seed meter 20 by a seed tube 24. A closing assembly 26 may be coupled to each row unit 14 and is used to close the furrow with the seed or other product contained therein.

In one embodiment, the seed meter 20 is a vacuum seed meter, although in alternative embodiments other types of seed meters using mechanical assemblies or positive air pressure may also be used for metering seed or other product. As described above, the present disclosure is not solely limited to dispensing seed. Rather, the principles and teachings of the present disclosure may also be used to apply non-seed products to the field. For seed and non-seed products, the row unit 14 may be considered an application unit with a secondary hopper 18 for holding product, a product meter for metering product received from the secondary hopper 18 and an applicator for applying the metered product to a field. For example, a dry chemical fertilizer or pesticide may be directed to the secondary hopper 18 and metered by the product meter 20 and applied to the field by the applicator.

Referring to FIG. 1, the chassis or main frame 12 of the machine 10 may further support a main hopper or tank 30 and a blower or fan 32. The main hopper or tank 30 may include a lid 47 at a top end thereof. The blower or fan 32 may be operably driven by a hydraulic motor. In another embodiment, however, other motor arrangements such as an electric motor and the like may be used.

As product such as fertilizer or seed is deposited into the tank 30, the product flows by gravity to the nozzle assembly 39. The upstream side of the nozzle assembly 39 is provided with a number of air inlets 41 corresponding to the number of air supply hoses 38. The air inlets 41 may be spaced transversely along the upstream side of the nozzle assembly 39. The downstream side of the nozzle assembly 39 may be provided with a number of product outlets 43 corresponding to the number of air supply hoses 38. The product outlets 43 may also be spaced transversely along the downstream side of the nozzle assembly 39. The product outlets 43 lie opposite from the air inlets 41. Each air inlet 41 is aligned with a respective product outlet 43. As shown in FIG. 1, distribution or product supply hoses 42 may be coupled to and extend from the product outlets 43 to the individual secondary hoppers 18 for directing product entrained in the air stream to the secondary hoppers 18.

An air stream passing from the air inlet 41 to the product outlet 43 can collect product and direct it through a corresponding distribution or product supply hose 42 to the respective secondary hopper 18. The transfer of product from the tank 30 to the secondary hoppers 18 can be done automatically as product is needed by the secondary hopper 18. As an individual secondary hopper 18 fills up with product, an inlet 60 of the secondary hopper 18 becomes covered by product blocking and slowing the air stream so that the air stream no longer picks up product in the tank 30 and transports the product to the secondary hopper 18. Conversely, as product is metered by the product meter 20 and dispensed to the ground, the quantity of product in the hopper 18 begins to drop such that the inlet 60 can be uncovered. As this happens, the air stream from the blower 32 picks up product for delivery to the secondary hopper 18. In this way, the secondary hoppers 18 may be continuously and automatically provided with product on-demand so long as the blower 32 is running and product is available in the nozzle assembly 39. The side walls of each secondary hopper 18 may be provided with screen vents for venting air pressure in the secondary hopper 18.

The machine 10 is configured to include a product distribution assembly 28 which can include the nozzle area 39 of the tank 30, each distribution hose 42, each secondary hopper 18, and each meter 20.

Figure 2A:
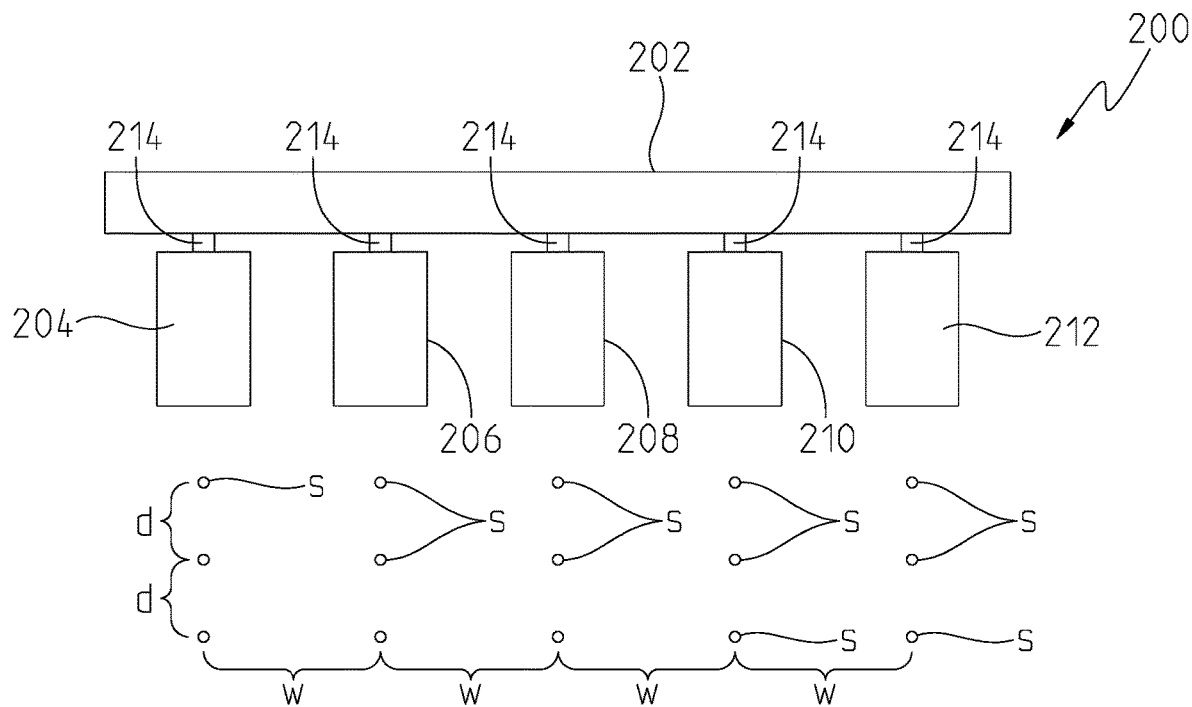
FIG. 2A is a schematic of a conventional planter with a plurality of row units.
Figure 2B:
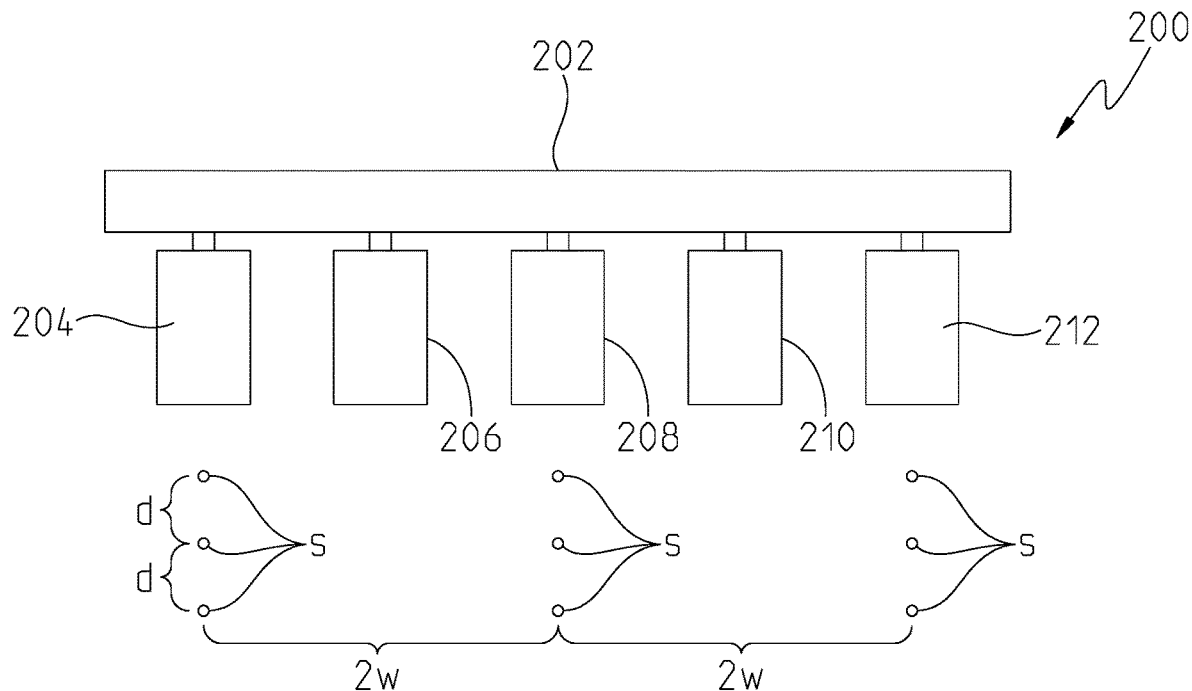
FIG. 2B is another schematic of the conventional planter of FIG. 2.

A conventional planter 200 is shown in FIGS. 2A and 2B. The machine 200 may include a frame or toolbar 202. A plurality of row units may be attached to the toolbar 202. In the illustrated embodiment, the plurality of row units may include a first row unit 204, a second row unit 206, a third row unit 208, a fourth row unit 210, and a fifth row unit 212. The illustrated row units may be part of an 8-row unit, 12-row unit or 24-row unit implement but which only a portion of the implement is shown. Each row unit may be attached via a fixed connection 214 to the toolbar 202.

In FIG. 2A, the conventional machine 200 may traverse a field whereby each row unit is functioning to deposit a seed, S, along each given row. The distance between each seed, S, along a given row may be defined as d. The spacing between adjacent rows may be defined as w. The distance, d, and row spacing, w, is constant between seeds and row units, respectively. In this embodiment, the machine is planting the seeds in a narrow row spacing configuration.

In FIG. 2B, the conventional machine 200 is planting seed in a wide row spacing configuration. Here, only the first row unit 204, third row unit 208, and fifth row unit 212 are operational while the second row unit 206 and fourth row unit 208 are not being used. The distance between seeds, S, in a given row can be the same or different as in FIG. 2A, and the row spacing between rows may be twice that or some multiple of FIG. 2A.

In the illustration of FIG. 2B, the unused row units are simply adding wasteful weight to the frame 202 and further compacting the field. The distance between adjacent row units is not adjustable in the conventional machine except by enabling or disabling a given row unit. Thus, if an operator wants to change from planting wheat at a narrow row spacing to planting corn at a wider row spacing, the operator can only control the use of one or more row units to achieve the desired row spacing.

To overcome the disadvantages of the aforementioned conventional planter, the present disclosure discloses a first embodiment of a planter with an adjustable frame design in the form of an accordion-style frame. The accordion-style frame design, as well as other frame designs disclosed herein, is advantageous in that as row units move closer together a first group of row units form a front row or rank and a second group of row units form a rear row or rank. In a wide configuration, i.e., where the row spacing is greater between adjacent rows, the front and rear ranks may be disposed along a linear axis. In a narrow configuration, i.e., where the row spacing is smaller between adjacent rows, the rear rank of row units may move rearward such that adjacent row units may be displaced in the fore-aft direction. This is shown in FIGS. 3 and 4 of the present disclosure.

Figure 3:
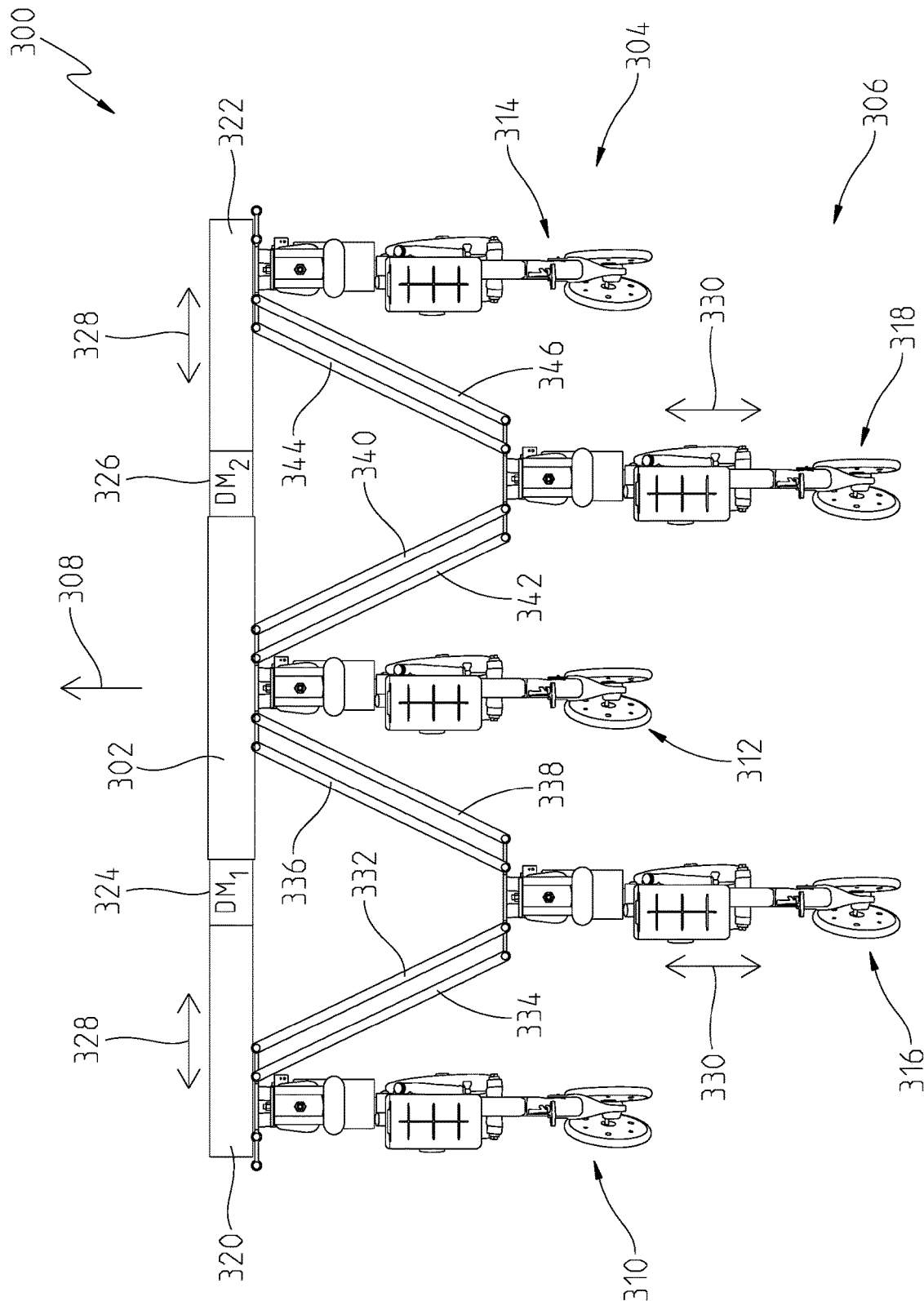
FIG. 3 is a schematic of one embodiment of a work machine with an adjustable frame and a plurality of row units.
Figure 4:
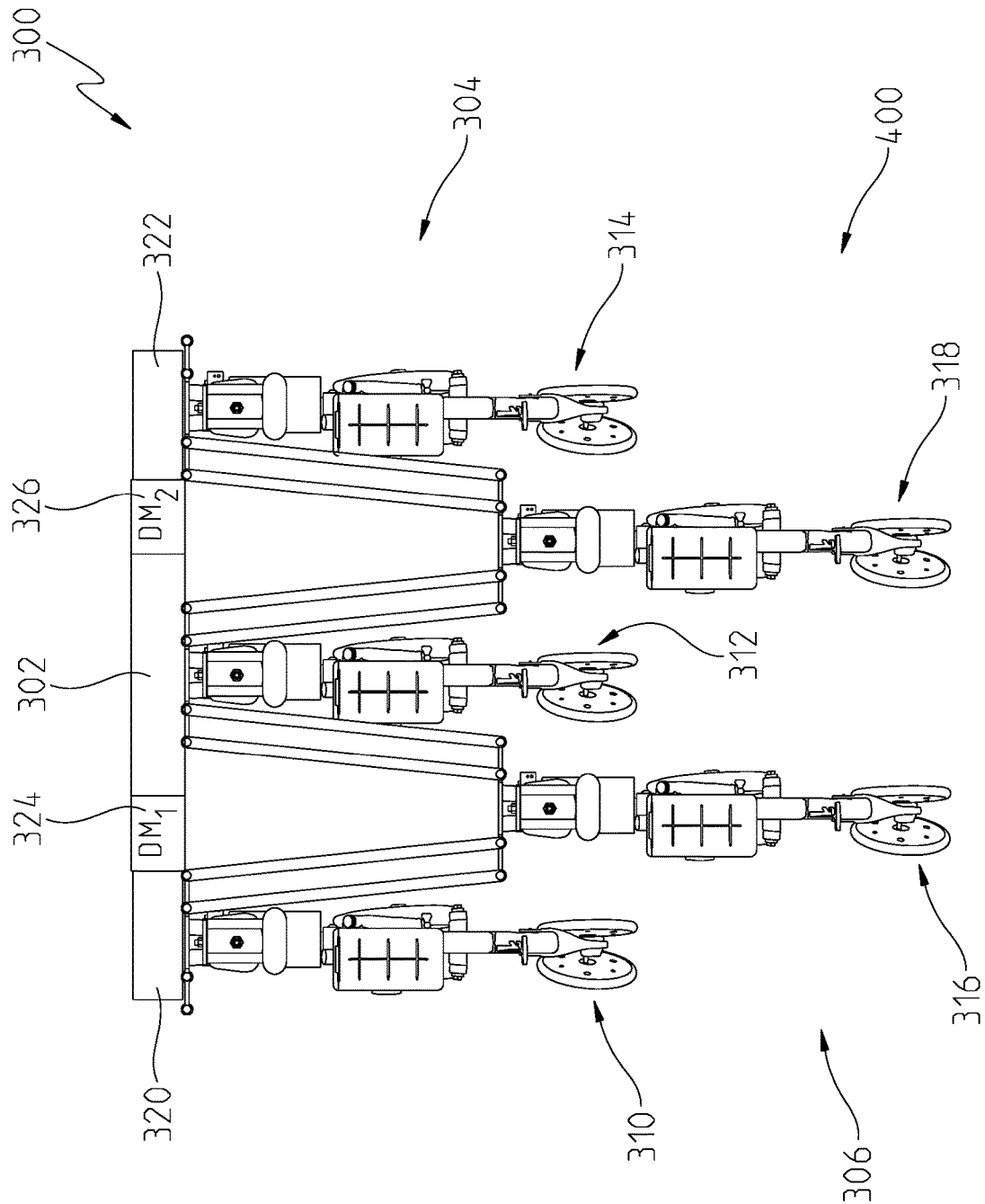
FIG. 4 is a schematic of the work machine of FIG. 3 in a narrower row spacing configuration.

In FIG. 3, for example, a planter 300 is illustrated. The planter 300 may include a main frame 302 or toolbar. The planter 300 may include a plurality of row units coupled to the main frame 302 for performing a planting or seeding operation as the machine 300 travels in a forward travel direction 308. Other tools may be coupled to the row unit for performing other functions such as weeding, fertilizing, etc. The plurality of row units may be arranged in a first or front rank (or row) 304 and a second or rear rank (or row) 306. In the illustrated embodiment, the first rank 304 may include three row units and the second rank 306 may include two row units. In other embodiments, however, there may be any number of row units in each rank.

In the first rank 304, the plurality of row units includes a first row unit 310, a second row unit 312, and a third row unit 314. In the second rank 306, the plurality of row units includes a fourth row unit 316 and a fifth row unit 318. Each row unit may be substantially similar and capable of planting the same type of crop. Alternatively, one or more of the row units may be different and capable of performing a different function.

The first rank of row units may be directly coupled to the main frame 302, whereas the second rank of row units may be coupled to the main frame 302 via different arms. Specifically, in FIG. 3, the first row unit 310 may be coupled to a first frame member 320 which is axially displaceable relative to the main frame 302 in an axial direction 328. The second row unit 312 may be coupled to the main frame 302, while the third row unit 314 may be coupled to a second frame member 322. The second frame member 322 may be axially adjustable along an axial direction 328 relative to the main frame 302. Thus, the first row unit 310 and third row unit 314 may be adjusted axially (or laterally) relative to the second row unit 312 to achieve different row spacings and width configurations.

In one embodiment, to move the first and third row units relative to the second row unit 312, a first drive unit 324 may operably move the first frame member 320 in the axial direction 328 relative to the main frame 302. Similarly, a second drive unit 326 may operably drive the second frame member 322 in the axial direction relative to the main frame 302. In an alternative embodiment, a single drive unit may be capable of moving the first frame member 320 and second frame member 322 relative to the main frame 302. The one or more drive units may use an electric, hydraulic, or pneumatic actuator to operably move frame members. Alternatively, the one or more drive units may include a motor and a gear or a rack and pinion gearing to achieve the axial movement. Other types of electric or hydraulic drive mechanisms may be used for moving the frame members relative to the main frame 302.

In one example, the first and second drive units (or single drive unit) may comprise electric linear actuators which are operably controlled by an electronic control unit or controller. The first frame member 320 and second frame member 322 may be telescopically coupled to the main frame 302 such that via linear actuation the frame members can be moved in the axial direction 328 relative to the main frame 302. The control unit can operably control the speed and distance of axial movement of the pair of frame members to be substantially the same.

In one embodiment, the combination of the main frame 302, first frame member 320 and second frame member 322 may form a telescoping toolbar. In another embodiment, the main frame 302 may telescope relative to the first and second frame members such that only the main frame moves in an axial direction. In any event, the outer row units along the first rank 304 may move relative to the middle or second row unit 312 to adjust the row spacing of the planter 300.

As the front rank 304 of row units move, the rear rank 306 of row units may also move in a fore-aft direction 330. Here, the fourth row unit 316 may be operably coupled to the first frame member 320 via a first arm 332 and a second arm 334. Each arm may be fixed in length and thus do not adjust. Alternatively, in another embodiment, the arms 332, 334 may be adjustable in length (e.g., may be a pair of links that are telescopically coupled to one another). Similarly, the fourth row unit 316 may be coupled to the main frame 302 via a third arm 336 and a fourth arm 338. Each arm may be pivotally coupled to the respective frame and/or the fourth row unit 316.

The fifth row unit 318 may be coupled to the main frame 302 via a fifth arm 340 and a sixth arm 342, and to the second frame member 322 via a seventh arm 344 and an eighth arm 346. Each arm may be pivotally coupled to the respective frame or the fifth row unit 318. Similarly, the arms may be fixed in length, although in other embodiments the arms may be adjustable such as in a two-piece telescoping arrangement.

In FIG. 3, the planter 300 may be configured to plant at a wider row spacing (e.g., 30" between rows. Referring to FIG. 4, the same machine 300 is shown in a narrower configuration where the row spacing may be reduced to 10" per row, for example. To achieve this different row spacing, the first and second drive units (or, in an alternative embodiment, a single drive unit) may operably move the first frame member 320 and second frame member 322 in the axial direction so that the first row unit 310 and third row unit 314 move closer to the second row unit 312. As this happens, the different arms coupled to the fourth and fifth row units may pivot about their defined pivotal connections to the first frame member 320, second frame member 322, main frame 302 and respective row unit. Moving from a wider configuration to a narrow configuration can cause the rear rank 306 of row units to move rearward away from the main frame 302 and front rank of row units.

Although not shown, a motor may be coupled to each arm or to at least one arm to assist with the pivotal movement of the arms to achieve the fore-aft movement of the rear rank 306 of row units. In another embodiment, a motor may be coupled at the row unit to cause the arms to only pivot at the row unit and not at the aforementioned frames.

In this embodiment, the first arm 332 and second arm 334 may remain parallel to one another through the fore-aft movement of the rear rank. This same parallel relationship may exist with the other pairs of arms. In other embodiments, the first arm 332 and second arm 334 may be angled relative to one another.

With the accordion-style frame design of FIGS. 3 and 4, as rows move closer together the rear rank of row units can move rearward and thus the fore-aft spacing between the front and rear ranks changes. This can be advantageous such that as the rows move closer together it can be desirable to space the front and rear ranks further apart in the fore-aft direction to allow field residue to pass therebetween more easily. Field residue is any material leftover in the field such as fodder from corn stalks, bean vines, rocks, dirt clots, etc. When the row units are moved closer together, the field residue has less room to move between juxtaposed row units as the planter moves through the field. With the additional fore-aft spacing in accordance with the present disclosure, however, the residue is able to pass more easily between row units as the planter moves through the field.

Another feature or advantage of the accordion-style frame design or any of the adjustable frame designs disclosed in the present disclosure is the ability to achieve equidistant plant spacing in a field. Generally, row spacing is established when an operator chooses the planter or seeder at the time of purchase. Row spacing is generally based on certain criteria including crop type, field conditions, and the like. For example, an operator may choose a row spacing of 10" for wheat or canola, 15" for soybeans, or 30" for corn. These row spacings are only provided as an example and are not intended to be limiting. The operator may often plant seeds closer together along the row (intra-row spacing) rather than between rows but lacks the flexibility of changing the inter-row spacing. In the present disclosure, however, one or more embodiments of a planter are disclosed which offer greater flexibility over conventional machines. The row width of a planter or seeder, such as the ones depicted in FIGS. 3 and 4, is capable of being adjusted at an initial setup to establish a desired row spacing as well as dynamically in the field. This change in row width may also be accompanied with a change in the working width of the planter or seeder.

In spite of conventional planting, it is desirable to get the most possible yield out of the land. An operator may desire to plant corn at 30,000 seeds per acre. This seed population number is generally based on how productive the soil is, how much moisture is in the soil, seed variety, etc. With equidistant plant spacing technology, however, an operator may be able to increase the seed population and therefore increase yield. If, for example, an operator wants to increase the seed population of soybean plants from 150,000 seeds per acre to 300,000 seeds per acre, the frame may be adjusted dynamically to change the distance between rows at the same time the seed meters are adjustably controlled to change the desired distance between seeds within a given row (i.e., intra-row spacing).

Figure 5A:
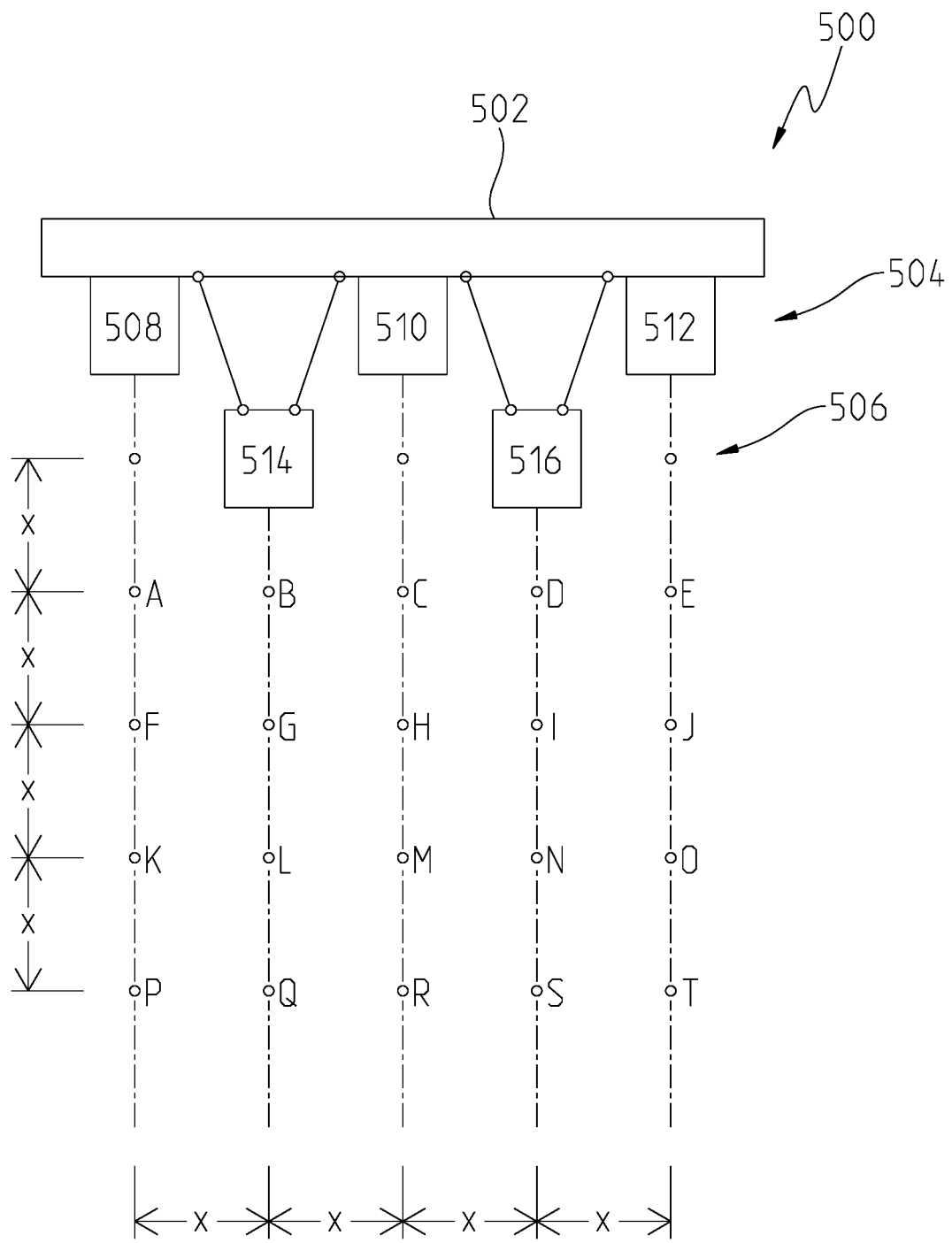
FIG. 5A is a schematic of the work machine of FIG. 3.
Figure 5B:
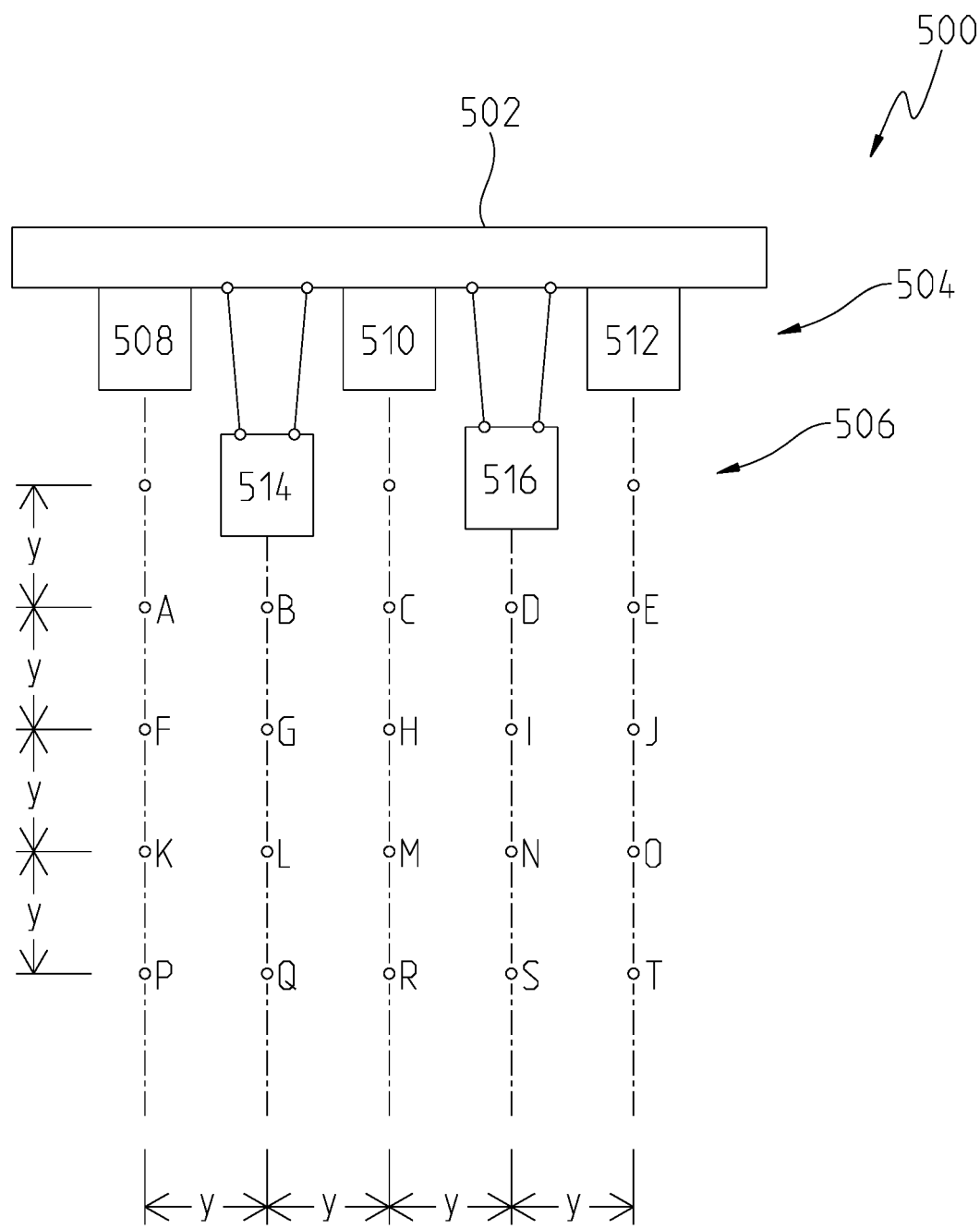
FIG. 5B is another schematic of the work machine of FIG. 3.

Equidistant plant spacing using the adjustable frames of the present disclosure is shown in FIGS. 5A and 5B. Here, the seeds can be planted equidistantly along two axes, i.e., in the fore-aft direction and in the lateral or axial direction. In other words, the distance between seeds is substantially the same with intra-row spacing (i.e., spacing between seeds in the same row) and inter-row spacing (i.e., spacing between seeds in adjacent rows). If the operator wants to change seed population from 30,000 seeds/acre to 45,000 seeds per acre, then the frame can be adjusted so that the intra-row spacing and inter-row spacing is dynamically changed to meet the increased seed population. A further advantage of equidistant plant spacing is it allows each plant the same amount or access to minerals, sunlight, nutrients, moisture, etc. in the four major directions of a respective seed.

In FIG. 5A, a planter 500 is shown having a frame or toolbar 502. The planter 500 may include a first or front rank 504 of row units and a second or rear rank 506 of row units. The front rank 504 may include a first row unit 508, a second row unit 510, and a third row unit 512. The rear rank 506 may include a fourth row unit 514 and a fifth row unit 516. Other embodiments may include any number of row units, and FIGS. 5A-B is only one example of such an arrangement of row units.

The front row of row units may be coupled directly to the frame or toolbar 502, whereas the rear rank of row units may be coupled to the frame or toolbar 502 via one or more arms. The planter 500 may comprise an accordion-style frame design similar to that in FIGS. 3-4. Alternatively, the planter 500 may comprise a scissor-style frame design as described below. In the illustrated embodiment, the rear rank of row units may move in a fore-aft direction as the width of the overall frame is controlled between a wide configuration and a narrow configuration.

As shown, each row unit is capable of depositing a seed in each row as the planter 500 moves in a forward travel direction. The meters can be operably controlled to deposit a seed into a furrow formed in the soil. The meters can be controlled to deposit seeds to maintain a desired intra-seed spacing. In FIG. 5A, this intra-row spacing is shown as a distance, x, between seeds in the same row. Each seed is represented by a circle or black dot. Thus, in FIG. 5A, the first row unit 508 may deposit a first seed represented as a seed A, a second seed represented as seed F, a third seed represented as seed K, and a fourth seed represented as seed P along a first row. The spacing between seeds A and F may be defined by distance x. In the same way, the spacing between second seed F and third seed K may also be defined by distance x. Likewise, the distance between third seed K and fourth seed P may also be defined by distance x.

In equidistant planting, it is desirable for the intra-row spacing and inter-row spacing to be substantially the same. However, due to machine limitations, there can be some variation between intra-row spacing and inter-row spacing.

Further, the second row unit 510 may deposit a plurality of seeds along a second row including a seed represented as seed C and another seed along the same row represented as seed H. The spacing between seeds C and H may be defined by distance x. Likewise, the second row unit 510 may deposit seeds M and R, which are spaced apart by distance x. The third row unit 512 may deposit seeds E, J, O, and T, as shown in FIG. 5A. Similar to the other intra-row spacing, the spacing between seeds E and J, J and O, and O and T may be defined by distance, x. Likewise, the fourth row unit 514 may deposit seeds B, G, L, and Q within the same row such that the spacing therebetween may be defined by distance, x. In the same way, the fifth row unit 516 may deposit seeds D, I, N, and S such that the spacing therebetween may be defined by distance x. Thus, the intra-row spacing between seeds may be the same for each row. In other words, the distance between seeds in each row is equidistant, and the distance between rows is equidistant such that seeds in the lateral or axial direction are also spaced by distance x.

As shown in FIG. 5A, the spacing between seeds within the same row and between adjacent rows forms a square-like pattern. In other words, the spacing between seeds A, B, F and G forms a square pattern where the distance between seeds is defined by distance x. In the same way, the spacing between seeds B, C, G and H forms a square pattern where the spacing between seeds is defined by distance x. The same is true for the spacing between seeds D, E, I, and J.

As noted above, but with the spacing of seeds in these embodiments, each plant can have access to the same amount of minerals, sunlight, nutrients, moisture, and other benefits.

Moreover, if an operator is planting seeds in a 4" square pattern and wants to change to an 8" square pattern, the intra-row spacing and inter-row spacing needs to be increased by 4". To do so, an adjustable frame that can be dynamically changed during the planting operation is needed. Further, a control system is needed to control the output of each individual metering device on each row unit to control the number of seeds and/or spacing between seeds being deposited within a given row. Many conventional planters are capable of adjusting the intra-row spacing during a planting operation, but most row units are fixed such that the inter-row spacing cannot be adjusted without enabling or disabling one or more row units. As shown in the embodiments of FIGS. 3 and 4, however, the present disclosure provides a planter having an adjustable frame that can be changed dynamically during a planting operation to adjust the inter-row spacing of seeds.

Turning to FIG. 5B, for example, an operator may operably control the inter-row spacing and intra-row spacing between seeds such that the spacing is defined by distance y. Here, the first row unit 508 and third row unit 512 may be dynamically moved closer to the second row unit 510. In doing so, the fourth row unit 514 and fifth row unit 516 may move rearward as a result of the adjustment. Moreover, in this embodiment, the seeds are deposited by each row unit along the same lateral axis. In other words, the row spacing may be adjusted by dynamically changing the lateral distance between row units in the front rank and moving the row units in the rear rank in the fore-aft direction.

In FIG. 5B, the first row unit 508 may deposit seeds A and F along a first row, the fourth row unit 514 may deposit seeds B and G, the second row unit 510 may deposit seed C, the fifth row unit 516 may deposit seed D, and the third row unit 512 may deposit seed E. Again, the planter 500 is depositing the seeds in an equidistant, square-shaped pattern. For example, the distance between seeds A and B, B and C, C and D, and D and E may be defined by distance y. Thus, seeds A, B, F and G form a square like pattern where the distance between seeds A and B, B and G, F and G, and A and F may be defined by distance y.

Figure 5C:
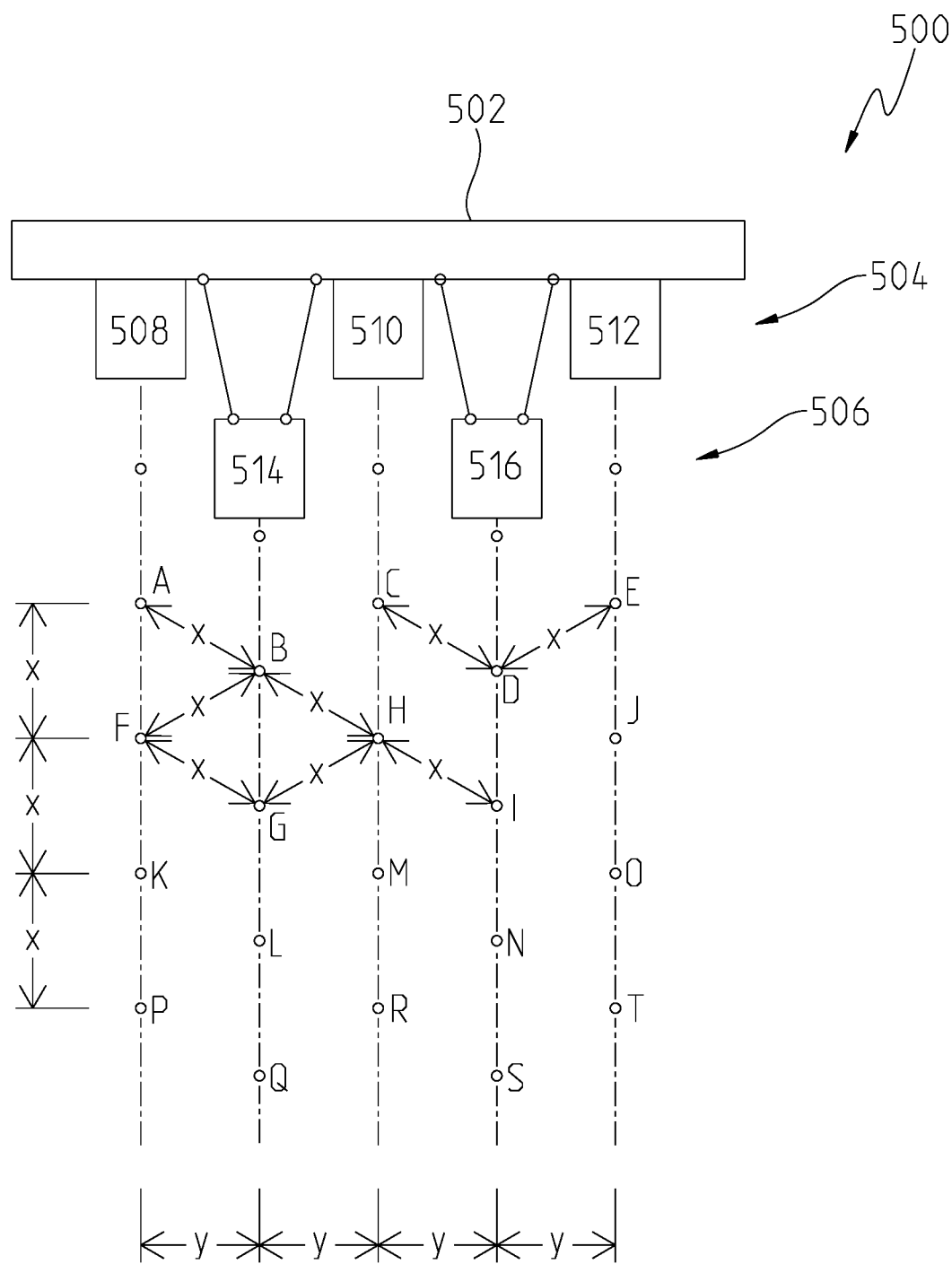
FIG. 5C is another schematic of the work machine of FIG. 3.

In FIGS. 5A and 5B, examples of the planter 500 depositing seeds in a square-like pattern are shown. However, the planter 500 is capable of planting in other patterns. For example, the planter 500 may be capable of planting in a diamond-shaped pattern. In the embodiment of FIG. 5C, for example, a diamond shape may be formed between any four adjacent seeds, where the distance between adjacent seeds is substantially the same. In FIG. 5C, the first row unit 508 may deposit seeds A, F, K and P. The fourth row unit 514 may deposit seeds B, G, L and Q. The second row unit 510 may deposit seeds C, H, M and R, whereas the fifth row unit 516 may deposit seeds D, I, N, and S. The third row unit 512 may deposit seeds E, J, O and T.

In this embodiment, the spacing between seeds B and H, H and G, F and G, and B and F may be defined by distance x. The same may be true across the width of the planter where the distance between seeds C and D, D and E, D and J, H and I, etc. may be defined by distance x. In the diamond shaped equidistant planting, the seeds from the fourth row unit 514 and fifth row unit 516 may be 180° out of phase with respect to the seeds planted by the first row unit 508, the second row unit 510, and the third row unit 512.

Moreover, the distance between seeds in a given row (e.g., intra-row spacing between seeds A and F) may be the same, and the distance between each row (e.g., inter-row spacing between the first and fourth row units) may be the same. However, in the diamond shaped patter of FIG. 5C, the spacing between seeds in adjacent rows may be different from the actual row spacing (i.e., the distance X between seeds A and B may differ from the row spacing Y between the first row unit 508 and the fourth row unit 514).

In view of the above, it is desirable to have a machine where an operator or user can provide instructions with, inter alia, one or more of a desired seed population, row spacing, intra-row spacing, seed variety, and ground type to an electronic control unit or controller which can automatically adjust the row spacing between row units and further adjust the seed meter on each row unit to set the intra-row spacing as the machine performs a planting or seeding operation. The present disclosure provides a number of embodiments of planters and control systems capable of achieving infinite variation to account for dynamic spacing changes, changes in crop type, seed variety, soil structure, soil fertility, irrigation practices, etc. As a result, these planters are able to plant multiple types of crops, waste less fuel or energy by not carrying unused row units, better able to handle field residue in the field, and achieve the benefits of equidistant and/or near-equidistant planting.

In some embodiments, an operator of the planter or work machine may be capable of inputting a desired seed population. Seed population may be based on seed variety and ground type, for example. Upon inputting seed population, the controller may automatically determine the row spacing and intra-row metered seed spacing. Upon making these determinations, the controller may further automatically adjust the frame and control the seed meters on each row unit to achieve the desired seed population.

In other embodiments, there may be a need for the operator to input at least two of the desired seed population, row spacing or intra-row spacing. Upon doing so, the controller may determine the other factor and automatically adjust the frame and seed meters. For instance, in one example, the operator may set the seed population and row spacing, and the controller in turn calculates the intra-row spacing and automatically controls the seed meters. In another example, the operator may set the seed population and intra-row spacing, and the controller determines row spacing and adjusts the frame accordingly. In a further example, the operator may set the desired row spacing and intra-row spacing, and the controller in turn determines the seed population.

Along similar lines, many planters are capable of variable-rate planting to take advantage of ideal ground conditions. For example, in areas where the ground is not ideal for planting, the planter can be controlled to reduce the output of seeds per acre (i.e., reduce seed population). In the present disclosure, the adjustable frames of each planter is capable of variable-rate planting not only by adjusting intra-row spacing, but also by dynamically changing the inter-row spacing and thereby achieving the various desired seed population. This may not be feasible for row-crop plants due to limitations with harvesting equipment, spraying equipment, or irrigational limitations, etc. Nonetheless, it may be feasible with other crop types such as cereals or soybeans, etc. Again, this can be done based on seed type (e.g., wheat, canola, corn, soybean, etc.) and variations within the type of seed. Moreover, where the ground conditions are more ideal, the control system on the planter may reduce the seed spacing so that more seed is planted per acre in order to take advantage of the better soil. Similarly, when the soil is not as good, the row spacing may increase so that seed population decreases in less ideal soil areas.

If an operator determines that the weather is going to change quickly, e.g., rain is approaching, the operator can command the controller or control unit to adjust the frame to a wider configuration to an increased row spacing in an effort to cover more of the field with seed in advance of the inclement weather. In some embodiments, when the planter or work machine shifts to a wider row-spacing, and thus a wider machine width, the controller may automatically adjust the intra-row spacing to be reduced in an effort to maintain the same or a similar population rate in the field. This flexibility also applies to an autonomous agricultural machine where the controller can adjust the frame width to a narrow configuration for transport purposes. In many conventional machines, one or more sections of the machine are folded in one or more directions to reach a transport configuration. For example, in some typical frame-folding regimes, frame members may be folded in the fore-aft-folding direction, or folded vertically, or some combination thereof. With the adjustable frame design in the present disclosure, the planter frame can be adjusted to a narrow configuration for transport as described below.

The autonomous planter may include a telescoping frame to achieve its narrowest configuration for transport purposes. The machine may include wheels and a power system for maneuvering the machine through the field. Alternatively, the machine may include electric motors for driving a track or wheel through the field. In yet another embodiment, one or more batteries may be provided for powering the machine. In a further embodiment, a diesel engine may be provided for powering the machine. Other power systems may be used to operably produce the power needed to drive the machine through the field.

Figure 6:
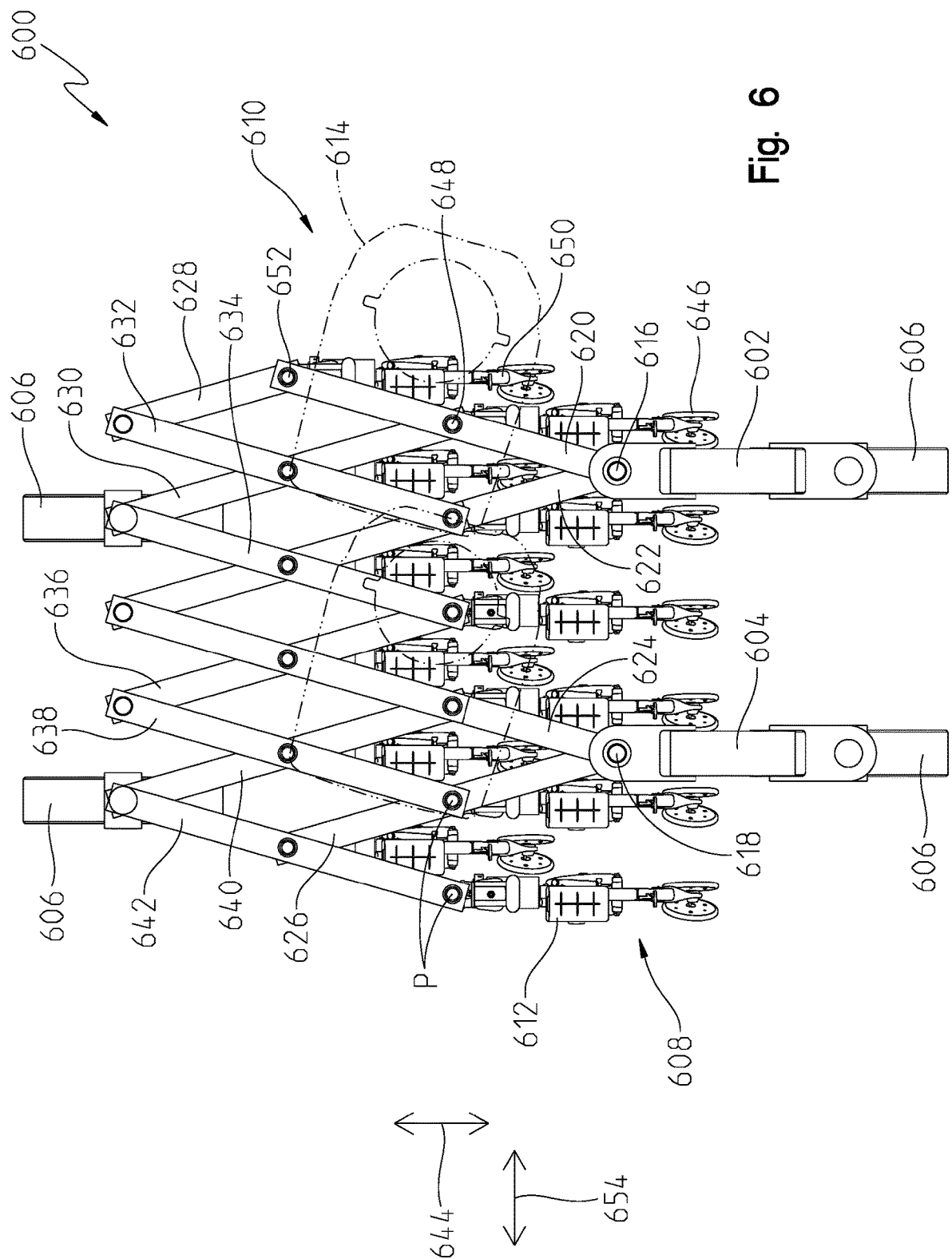
FIG. 6 is a schematic of a second embodiment of a work machine with an adjustable frame and a plurality of row units.

In FIG. 6, another embodiment of a planter 600 is shown. Here, the planter 600 may include a scissor-style adjustable frame design. The frame design may include a first frame portion 602 and a second frame portion 604. In FIG. 6, the machine 600 is shown in its narrow configuration where row spacing between seeds may be at its smallest distance, whereas in FIG. 7 the same machine 600 is shown in a wide configuration 700 where the row spacing between seeds may be greater than the row spacing in FIG. 6.

The frame may be supported on the ground by one or more wheels 606. In an alternative embodiment, tracks or other ground-engaging mechanism may be used to support the frame. The frame may be designed to support one or more row units 612. In FIG. 6, the one or more row units 612 may be arranged in a first or front rank 610 and in a second or rear rank 608. While only two ranks of row units are shown, in other embodiments there may be one or more ranks of row units coupled to the frame. The frame may support one or more tanks 614 for holding seed, fertilizer, etc.

The frame of FIG. 6 may include a plurality of pivots. A first pivot 616 may be coupled to the first frame portion 602 where a first member 620 and a second member 622 are pivotally coupled to the first frame portion 602. Similarly, a second pivot 618 may be coupled to the second frame portion 604 where a third member 624 and a fourth member 626 are pivotally coupled to the second frame portion 604. The different members may be frame members, links, or the like to which the plurality of row units 612 are coupled. In FIG. 6, for example, row units 612 may be coupled at point P to at least two members. For instance, a first row unit 646 may be coupled at point 648 where the first frame member 620 is pivotally coupled to a sixth member 630. Thus, the frame members are pivotally coupled to one another, and at these pivotal connections between members is where a row unit may be coupled. This is shown too with a second row unit 650 being coupled at a pivot location 652 between the first member 620 and a fifth member 628.

The plurality of members may also include a seventh member 632, an eighth member 634, a ninth member 636, a tenth member 638, an eleventh member 640, and a twelfth member 642. Other members may be provided in other embodiments, particularly where more row units are coupled to the frame. The pivot locations or points P on the frame provide pivotal connections between the different members in addition to coupling locations for a row unit 612. Row units 612 may be mounted and pivotally coupled along any of the frame members, and at any location along a respective frame member. In some embodiments, it can be advantageous to have one or more of the row units pivotally coupled to the frame members at a corresponding pivot location such as point P. In the illustrated embodiment, each frame member may have a defined length which does not change. In other embodiments, each member may be angularly adjusted via a telescoping actuator coupled between any two frame members. The actuator may be a hydraulic actuator, an electric actuator, or mechanical actuator (e.g., linear or rotary) for adjusting the various scissor frames.

Figure 7:
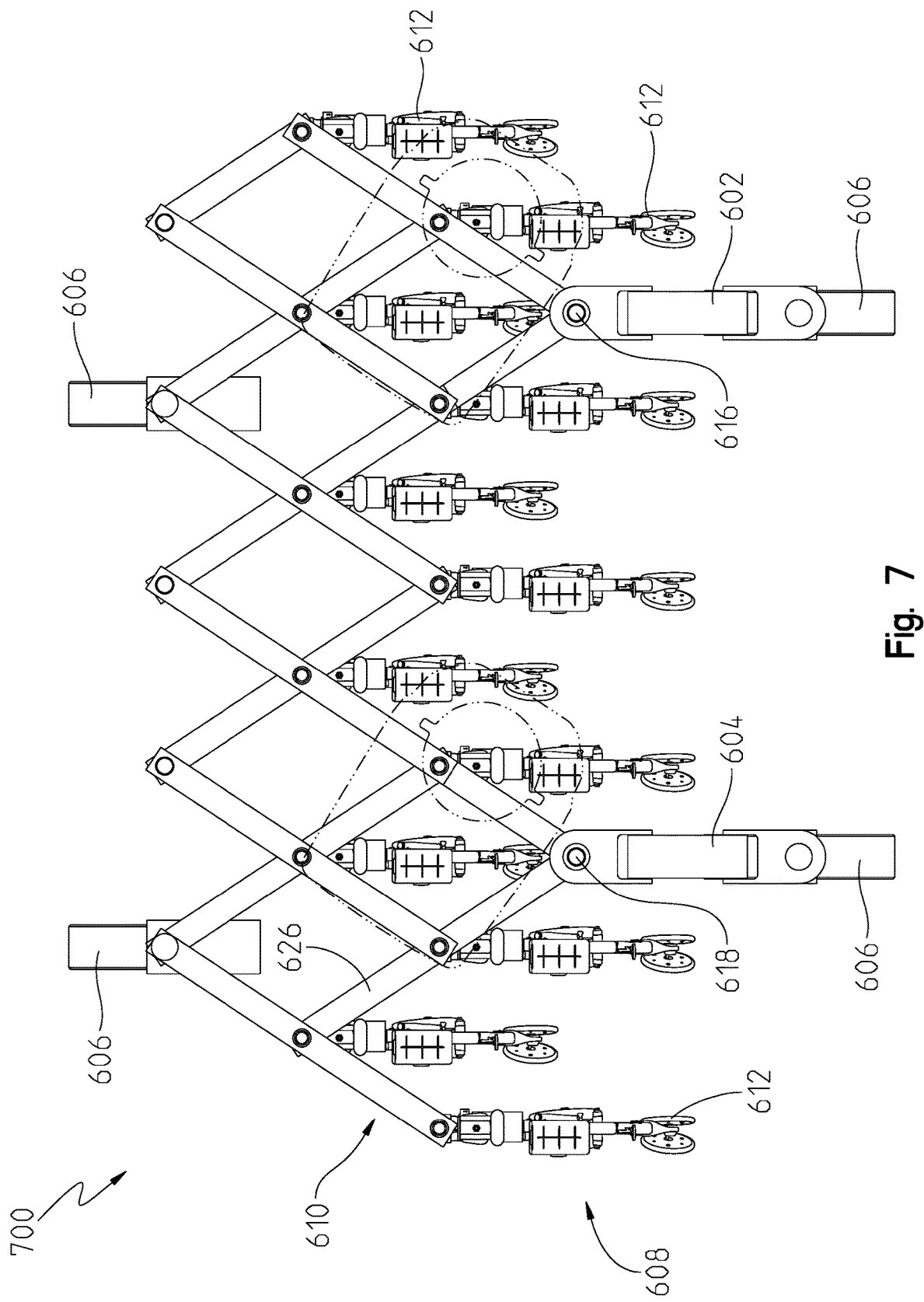
FIG. 7 is a schematic of the work machine of FIG. 6 in a wider row spacing configuration.

An electronic control unit or controller may be configured to receive instructions to adjust the frame of FIG. 6 from its narrow configuration to a wider configuration as shown in FIG. 7. To do so, an electric motor or other mechanism may operably pivot the members coupled to the first pivot 616 and second pivot 618 to move laterally outward. In FIG. 7, for example, the row units 612 in the front rank are shown spaced further apart in the lateral direction 654. As this happens, the rear rank of row units may move in the fore-aft direction 644. When moving between the narrow configuration of FIG. 6 to the wider configuration of FIG. 7, the row units in the rear rank 608 may move forward towards the front rank 610. Alternatively, if the frame is controlled from the wide configuration of FIG. 7 to the narrower configuration of FIG. 6, the rear rank 608 of row units 612 may move rearward away from the front rank 610.

Due to the scissor-style frame design of FIGS. 6 and 7, the row units 612 in the front rank 610 may also move in a fore-aft direction. For example, in FIG. 6, the row units 612 in the front rank 610 are located in a rearward position relative to the first and second frame portions, whereas in FIG. 7 the row units 612 in the front rank 610 are located in a more forward position relative to the first and second frame portions. Thus, the present disclosure provides a planter having an accordion-style frame design where the row units in the front rank do not move in the fore-aft direction and accordion scissor-style frame design where the row units in the front rank can move in the fore-aft direction. In each embodiment, however, the rear rank of row units does move in the fore-aft direction.

Figure 8:
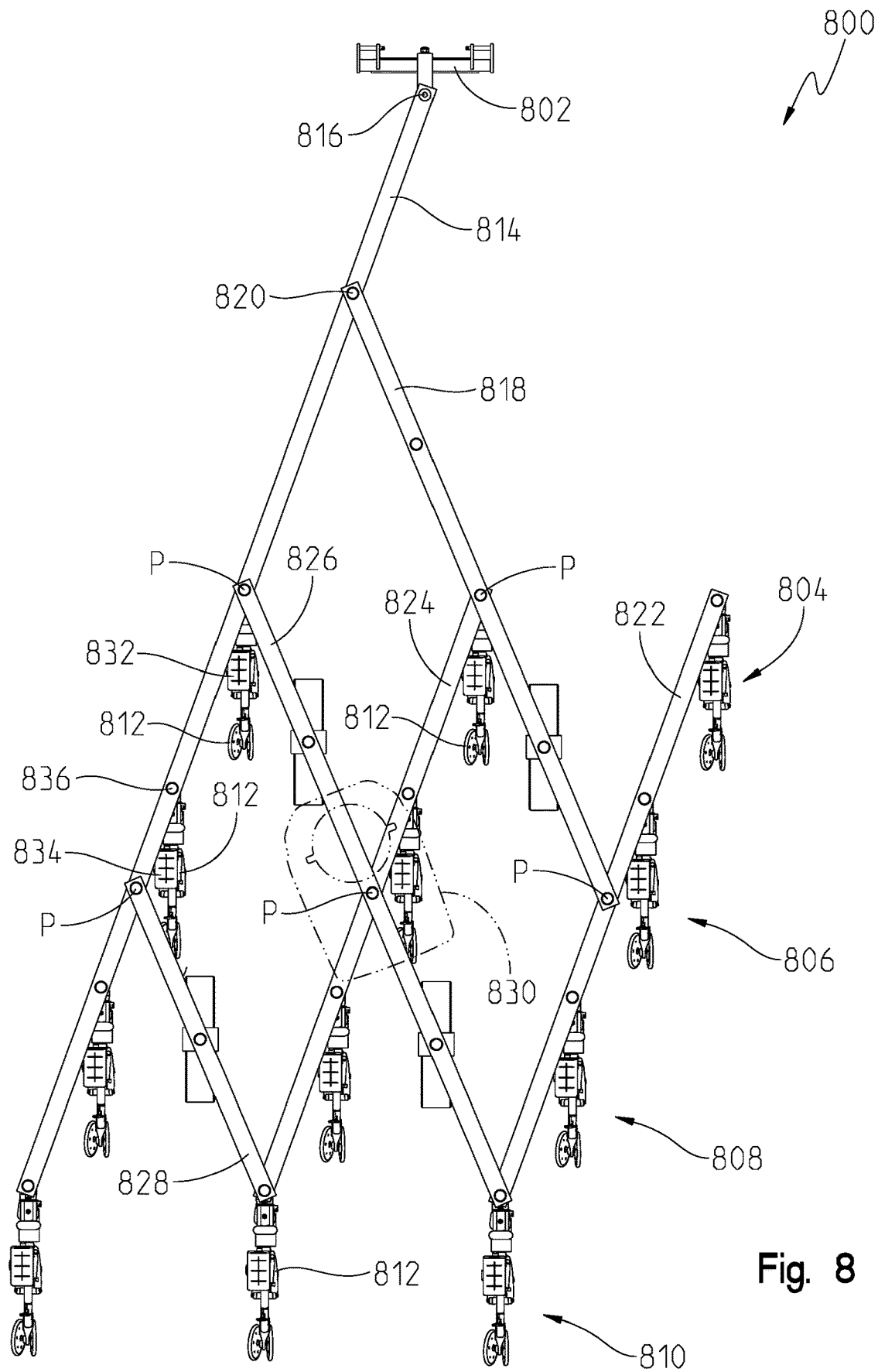
FIG. 8 is a schematic of another embodiment of a work machine with an adjustable frame and a plurality of row units.

In FIG. 8, another embodiment of a planter having an adjustable frame design is shown. Here, the planter 800 may include a frame member or toolbar 802 that can be used to hitch the frame to a tractor, for example. The frame 802 may be supported on the ground by a ground-engaging mechanism such as a wheel or track, as well as the hitch on the tractor. Here, the planter 800 may include a plurality of row units 812 for performing a planting, seeding, fertilizing or other operation. The planter 800 may include a first rank 804 of row units 812, a second rank 806 of row units 812, a third rank 808 of row units 812, and a fourth rank 810 of row units 812. The first rank 804 may be the forward-most rank of row units, whereas the fourth rank 810 of row units 812 may be the most rearward rank of row units. In other embodiments, there may be more or less ranks of row units, and thus FIG. 8 is only one example of this type of planter.

The planter 800 may include a first elongated member 814 which is pivotally coupled to the frame 802 via a first pivot 816. A second member 818 may be pivotally coupled to the first member 814 via a second pivot 820. Similarly, a fifth member 826 and a sixth member 828 may be pivotally coupled to the first member 814 at respective pivot locations P as shown in FIG. 8. A third member 822 may be pivotally coupled at different locations along its length to the second member 818 and the fifth member 826, and a fourth member 824 may be pivotally coupled at different locations along its length to the second member 818, fifth member 826 and sixth member 826.

The frame of FIG. 8 may be configured to support a tank 830 for holding seed, fertilizer or any other product to be dispensed in a field by a row unit 812.

Each row unit may be coupled to one or more of the members. For example, a first row unit 832 may be coupled at the pivot location, P, between the first member 814 and the fifth member 826 as shown in FIG. 8. Other row units may be coupled at the pivotal connection between two of the plurality of members as shown. Further, a second row unit 834 may be coupled to a single member. The second row unit 834 may be coupled to only the first member 834 at a connection point 836. Other row units may also be coupled to other members at a connection point.

In the embodiment of FIG. 8, a controller or control unit may operably control one or more actuators such as an electric motor, for example, which pivots the various frame members relative to one another when a change in row spacing is requested. Alternatively, any other type of hydraulic, rotary or linear actuator may be used. During travel, pivotal movement about the first pivot 816 may occur along a path of travel. An actuator may operably control the second member 818 to pivot about the second pivot 820 relative to the first member 814 to achieve the desired narrowing or widening of the planter. In one embodiment, there may be only a single actuator for controlling the frame width. In another embodiment, more than one actuator may be provided in an effort to minimize undesirable deflection of frame members and/or distribute the power into other actuators. If more than one actuator is provided, a controller may operably control each actuator so that the timing of actuation of each is relatively the same to avoid undesirable frame deflection. Further, angles of row units relative to different frame members may be controlled by various actuators, linkages, or passive castering. It is also contemplated that other power systems besides electric motors may be used to control frame movement to achieve desired row spacing including, but not limited to, batteries, hydraulic motors, actuators (e.g., electric, hydraulic, pneumatic, etc.), engines, and the like.

The embodiments of FIGS. 3-8 illustrate a plurality of different planters with adjustable frame designs capable of performing equidistant row spacing as described herein. Each frame design may be controlled by a local electronic control unit or controller coupled to the machine or to a tractor pulling the machine. Alternatively, a control system remote from the planter may control adjustments in row spacing. In any event, the present disclosure provides a planter with an adjustable frame design having a plurality of row units coupled thereto which can be used simultaneously during a work function (e.g., planting, seeding, fertilizing, etc.) to achieve a multitude of different row spacings without having to disable one or more row units. If an operator desires 8" row spacing, an instruction may be communicated to the control unit which in turn adjusts the width of the machine so that inter-row spacing is set at 8" and the motor which controls the seed meter of each row unit is controlled such that seeds are dispensed therefrom at 8" apart within the same row in the case of equidistant row spacing. These commands may be communicated to the control unit as a desired seed population value, inter-row spacing, intra-row spacing, or a combination thereof. Upon receiving the instructions, the angles between frame members may be dynamically adjusted relative to each other such that desired row spacing is achieved, which may also adjust a fore-aft distance between ranks. This flexibility allows an operator to change seed population as the planter travels in the field, and this change may induce dynamic adjustments to both row spacing and frame width to accommodate the change in population.

Figure 9:
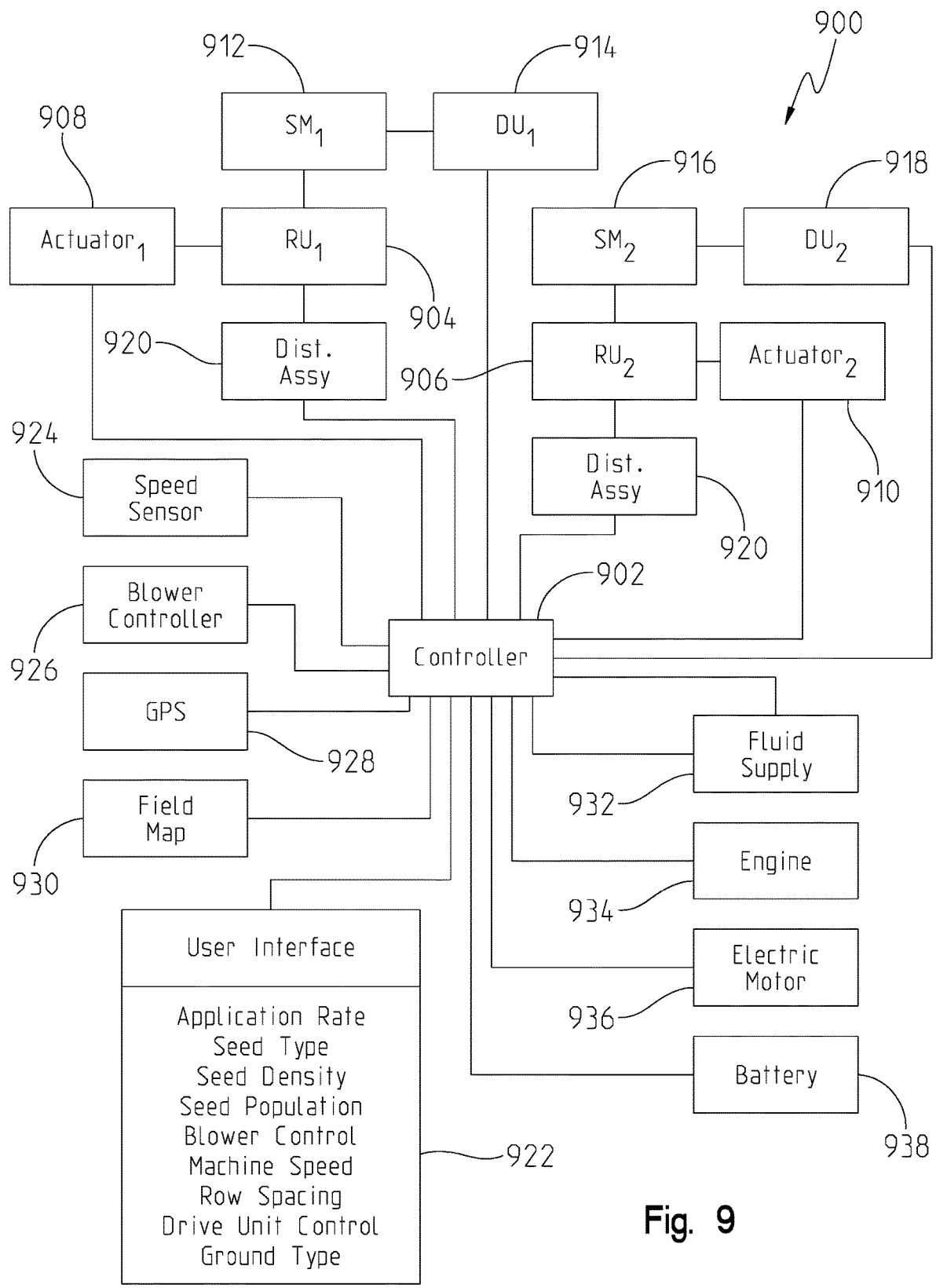
FIG. 9 is a schematic of a control system for controlling a work machine with an adjustable frame.

Referring to FIG. 9, one embodiment of a control system 900 is shown for controlling a planter with an adjustable frame design to control inter-row spacing and intra-row spacing. In this embodiment, the control system 900 may include an electronic control unit or controller 902. The controller 902 may include a memory for storing software, control logic, field maps 930, look up tables, and the like. The controller 902 may also include a processor capable of executing the software or control logic.

In this embodiment, the planter may include a first row unit 904 and a second row unit 906 coupled to the frame. The first row unit 904 may be in a front rank and the second row unit 906 may be in a rear rank. Alternatively, the first and second row units may be adjacent to one another in the same rank. There may be other row units as well capable of performing a work function. A central tank (not shown) may store seed, fertilizer or other material to be dispensed by each row unit. A distribution assembly 920 may be coupled between the tank and each row unit for delivering seed, for example, to the row unit. The first row unit 904 may include a first seed meter 912 and the second row unit 906 may include a second seed meter 916. The first seed meter 912 may be operably driven by a first drive unit 914 (e.g., an electric motor) and the second seed meter 916 may be operably driven by a second drive unit 918. The first drive unit 914 and the second drive unit 918 may be operably controlled by the controller 902 to adjust the intra-row spacing of seed being dispensed from the respective seed meter. As a result, the controller 902 can set the intra-row spacing between seeds by controlling the respective drive units.

The first row unit 904 may be operably moved via a first actuator 908 and the second row unit 906 may be operably moved via a second actuator 910. In this example, the pair of row units may be located in the front rank and directly coupled to the main frame or toolbar. The actuators may be operably controlled by the controller 902 to adjust the lateral spacing between row units as described above with respect to FIGS. 3 and 4. In other embodiments, the actuators may be electric motors or another drive mechanism for inducing a pivotal motion between members of the frame to control lateral or fore-aft movement of each row unit. Thus, the controller 902 may control inter-row spacing via the first and second actuators.

The controller 902 may also control a fluid supply 932 which supplies hydraulic fluid to control the actuators in the event they are hydraulic actuators. Moreover, if the drive units are hydraulic motors, the fluid supply 930 may supply fluid to drive the drive units. A blower may be controlled via a blower controller 926 which directs an airflow to move seed or fertilizer from the tank to each row unit. The controller 902 is operably coupled to the blower controller 926 to control its output.

An electric motor 936 may be coupled to the controller 902 for operably pivoting different frame members as described in the embodiments of FIGS. 6-8. Similarly, a battery 938 may provide power to the motor 936 or other device. The controller 902 may be electrically coupled to the battery 938 to detect its charge and output.

An engine 934 may power the planter through the field. The controller 902 may be in communication with the engine 934 as is known in the art. Alternatively, a large rechargeable battery may also provide the motive force for the entire planter or other energy storage device.

The controller 902 may be in communication with a variety of sensors such as a speed sensor 924 and/or global-positioning sensor (GPS) 928. The speed sensor 924 may detect the speed of the planter through the field and communicate this speed to the controller 902. The GPS 928 may communicate the location of the machine in the field. With the use of a field map 930 and other pertinent sensors that can detect objects, the controller 902 may identify objects such as trees, boundaries, types of soil conditions, and the like in a given area. The controller 902 may adjust the frame width based on the location of the machine in the field and the type of soil. Other sensors such as soil content sensors, row unit output sensors, etc. may be used and in communication with the controller 902.

The machine may also include a user interface 922 located on the planter or remote therefrom for controlling the output of each row unit and the machine. For example, the user interface may allow an operator to input commands relative to application rate, seed type, seed density, seed population, blower control, machine speed, row spacing (intra- and inter-row spacing), drive unit control, ground type and other known values. From this, the controller 902 can make dynamic adjustments to the frame width to control row spacing based on the instructions from the operator.

In some instances, prescriptions may be pre-loaded into the displays of the machine which can dynamically change seed population based on manual entry or telematically. With an autonomous machine, a user (e.g., a farmer) may enter information into his computer which is remote from the planter along with information from third parties such as an agronomist and seed company to determine the seed population as well as seed variety and types. This may also include where in the field to plant different seed populations. The autonomous planter may therefore perform the work function based on instructions from a farm management system.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. An adjustable frame assembly of a planter, comprising:
   a main frame;
   a first frame member movably coupled to the main frame, the first frame member being laterally movable along a first axis which is perpendicular to a direction of travel of the planter;
   a drive mechanism operably coupled between the main frame and the first frame member for moving the first frame member along the first axis relative to the main frame;
   a first arm having a first end and a second end, the first end being coupled to the main frame and the second end being coupled to a first row unit; and
   a second arm having a first end and a second end, the first end being coupled to the first frame member and the second end being coupled to the first row unit,
   the adjustable frame assembly configured to laterally move the first frame member relative to the main frame to adjust a fore-aft position of the first row unit relative to the direction of travel.

2. The adjustable frame assembly of claim 1, further comprising a second row unit coupled to the first frame member.

3. The adjustable frame assembly of claim 2, wherein a movement of the first frame member changes a distance between the first and second row units in a lateral direction and a fore-aft direction.

4. The adjustable frame assembly of claim 2, further comprising a third row unit coupled to the main frame, wherein movement of the first frame member relative to the main frame changes a distance between the third row unit and the first and second row units.

5. The adjustable frame assembly of claim 4, wherein movement of the first frame member changes the distance between the third row unit and the first row unit in the fore-aft direction.

6. The adjustable frame assembly of claim 4, wherein movement of the first frame member changes the distance between the second row unit and the third row unit only along the first axis.

7. The adjustable frame assembly of claim 1, wherein:
   a movement of the first frame member towards the main frame induces movement of the first row unit in a rearward direction; and
   a movement of the first frame member away from the main frame induces movement of the first row unit in a forward direction.

8. The adjustable frame of claim 1, wherein the drive mechanism comprises an electric actuator, a hydraulic actuator, or a rack and pinion gearing assembly.

9. The adjustable frame of claim 1, further comprising an electric motor operably coupled to the first arm to pivotally move the first arm relative to the main frame or first row unit.

10. The adjustable frame of claim 1, further comprising:
    a second frame member movably coupled to the main frame at an end opposite the first frame member, the second frame member being laterally movable along the first axis;
    a third arm having a first end and a second end, the first end being coupled to the main frame and the second end being coupled to a fourth row unit; and
    a fourth arm having a first end and a second end, the first end being coupled to the second frame member and the second end being coupled to the fourth row unit.

11. The adjustable frame of claim 10, further comprising a second drive mechanism operably coupled between the main frame and the second frame member for moving the second frame member along the first axis relative to the main frame.

12. The adjustable frame of claim 10, wherein the drive mechanism operably moves the second frame member relative to the main frame along the first axis.

13. An agricultural machine for traversing a field to perform a seeding operation, comprising:
    a main frame disposed along a first axis perpendicular to a forward travel direction;
    a first frame member movably coupled to the main frame, the first frame member being movable along the first axis;
    a first drive mechanism operably coupled between the main frame and the first frame member for moving the first frame member along the first axis relative to the main frame;
    a second frame member movably coupled to the main frame, the second frame member being movable along the first axis;
    a second drive mechanism operably coupled between the main frame and the second frame member for moving the second frame member along the first axis relative to the main frame;
    a plurality of row units for performing the seeding operation, the plurality of row units comprising at least a first row unit, a second row unit, a third row unit, a fourth row unit, and a fifth row unit;
    a first arm having a first end and a second end, the first end being coupled to the main frame and the second end being coupled to the fourth row unit;

a second arm having a first end and a second end, the first end being pivotally coupled to, and axially moveable with, the first frame member and the second end being coupled to the fourth row unit;

a third arm having a first end and a second end, the first end being coupled to the main frame and the second end being coupled to the fifth row unit; and a fourth arm having a first end and a second end, the first end being pivotally coupled to, and axially moveable with, the second frame member and the second end being coupled to the fifth row unit;

wherein, the first row unit is coupled to the first frame member, the second row unit is coupled to the main frame, and the third row unit is coupled to the second frame member, a fore-aft position of the first row unit being adjustable relative to the forward direction of travel with a movement of the first frame along the first axis, and a fore-aft position of the third row unit being adjustable relative to the forward direction of travel with a lateral movement of the second frame member along the first axis.

14. The agricultural machine of claim 13, wherein:

the first row unit, second row unit, and third row unit are arranged in a first rank;

the fourth row unit and fifth row unit are arranged in a second rank;

the first rank is located forward of the second rank.

15. The agricultural machine of claim 13, wherein:

a movement of the first frame member and second frame member towards the main frame induces movement of the first row unit and third row unit towards the main frame and the fourth row unit and fifth row unit in a rearward direction;

a movement of the first frame member and second frame member away from the main frame induces movement of the first row unit and third row unit away from the main frame and the fourth row unit and fifth row unit in a forward direction.

16. The agricultural machine of claim 15, wherein the second row unit remains stationary relative to the main frame during any movement of the first or second frame members.

17. An adjustable frame of a work machine, comprising:
a main frame;
a first frame member movably coupled to the main frame in an axial direction substantially perpendicular to a direction of travel of the work machine;
a drive mechanism operably coupled between the main frame and the first frame member for moving the first frame member relative to the main frame;
a first arm being coupled to the main frame at one end and to a row unit at an opposite end thereof; and
a second arm being coupled to the first frame member at one end and to the row unit at an opposite end thereof,
wherein the first arm and the second arm are pivotally displaceable with an axial movement of the first frame member relative to the main frame to adjust a fore-aft position of the row unit relative to the direction of travel.

18. The adjustable frame of claim 17, wherein a movement of the first frame member relative to the main frame induces a movement of the row unit in a fore-aft direction.

19. The adjustable frame of claim 17, further comprising a second row unit directly coupled to either the main frame or the first frame member, wherein a movement of the first frame member changes a distance between the row unit and the second row unit in the axial direction and the fore-aft direction.

20. The adjustable frame of claim 19, wherein:
as the first frame member is moved in the axial direction away from the main frame, the row unit moves in a forward direction and the second row unit moves outwardly away from the main frame;
as the first frame member is moved in the axial direction towards the main frame, the row unit moves in a rearward direction and the second row unit moves inwardly toward the main frame.

* * * * *